2,998,429
PROCESS FOR THE PREPARATION OF ISOMALEIMIDES
Carol K. Sauers, Middlebush, and Robert J. Cotter, New Brunswick, N.J., assignors to Union Carbide Corporation, a corporation of New York
No Drawing. Filed Nov. 24, 1959, Ser. No. 855,013
7 Claims. (Cl. 260—343.6)

This invention relates to isomaleimides. More particularly, this invention relates to a process for the preparation of N-substituted isomaleimides.

The N-substituted isomaleimides which can be prepared in accordance with the present invention have the general formula:

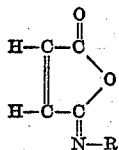

in which R is a monovalent hydrocarbon radical or a divalent hydrocarbon radical having as a substituent on its terminal carbon atom a radical having the formula:

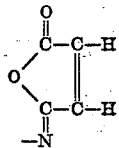

These latter N-substituted isomaleimides are commonly referred to as bis-isomaleimides.

The term "monovalent hydrocarbon radical" as used herein refers to substituted hydrocarbon radicals as well as unsubstituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxy-methyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenyl ethyl, 3-phenyl-n-propyl, 1-phenyl-n-butyl, 1-phenyl-n-docesyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl; p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p - n - dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following: N-methyl isomaleimide, N-ethyl isomaleimide, N-n-propyl isomaleimide, N-allyl isomaleimide, n-butyl isomaleimide, N-tertiary butyl isomaleimide, N-n-hexyl isomaleimide, N-(2-ethyl-n-hexyl) isomaleimide, N-n-heptyl isomaleimide, N-n-nonyl isomaleimide, N-n-dodecyl isomaleimide, N-n-docosyl isomaleimide, N-cyclohexyl isomaleimide, N-(2-chloroethyl) isomaleimide, N-(2-bromoethyl) isomaleimide, N-(2-fluoroethyl) isomaleimide, N-(2-iodo-n-propyl) isomaleimide, N-(2-chloro-n-hexyl) isomaleimide, N-methoxymethyl isomaleimide, N-benzyl isomaleimide, N-(2-phenylethyl) isomaleimide, N-(3-phenyl-n-propyl) isomaleimide, N-(4-phenyl-n-butyl) isomaleimide, N-phenyl isomaleimide, N-naphthyl isomaleimide, N-(o-chlorophenyl) isomaleimide, N-(m-bromophenyl) isomaleimide, N-(p-fluorophenyl) isomaleimide, N-(o-iodophenyl) isomaleimide, N-(o-methoxyphenyl) isomaleimide, N-(m-methoxyphenyl) isomaleimide, N-(p-ethoxyphenyl) isomaleimide, N-(p-n-butoxyphenyl) isomaleimide, N-(p-chloro-m-methyl-phenyl) isomaleimide, N-(o-methylphenyl) isomaleimide, N-(m-methylphenyl) isomaleimide, N-(o-ethylphenyl) isomaleimide, N-(m-ethylphenyl) isomaleimide, N-(p-ethylphenyl) isomaleimide, N-(o-isopropylphenyl) isomaleimide, N-(m-isopropylphenyl) isomaleimide, N-(p-isopropylphenyl) isomaleimide, N-(o-n-butylphenyl) isomaleimide, N-(m-n-butylphenyl) isomaleimide, N-(4-hydroxy-2-naphthyl) isomaleimide, N-(4-hydroxy-1-naphthyl) isomaleimide, and the like.

The term "divalent hydrocarbon radical" as used herein is intended to encompass both unsubstituted as well as substituted divalent hydrocarbon radicals. Illustrative of suitable radicals are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals, such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2-bromotrimethylene, 2-chloropentamethylene, 3-chlorohexamethylene, 2-chlorooctamethylene, and the like; alkoxy and aryloxy substituted alkylene and cycloaliphatic radicals, such as methoxy methylene, ethoxy methylene, ethoxy ethylene, 2-ethoxy trimethylene, 3-ethoxy pentamethylene, 1,4(2-methoxy cyclohexane), phenoxy ethylene, 2-phenoxy trimethylene, 1,3-(2-phenoxy cyclohexane), and the like: aralkylene radicals, such as phenyl ethylene, 2-phenyl trimethylene, 1-phenyl pentamethylene, 2-phenyl decamethylene, and the like; aromatic radicals, such as phenylene, napthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene), and the like.

Among N-substituted isomaleimides wherein R in the formula previously noted is a divalent hydrocarbon radical having as a substituent on its terminal carbon atom a radical having the formula:

can be noted N,N'-ethylene bis-isomaleimide, N,N'-trimethylene bis-isomaleimide, N,N'-tetramethylene bis-isomaleimide, N,N'-decamethylene bis-isomaleimide, N,N'-(1,4-cyclohexane) bis-isomaleimide, N,N'-(2-chlorotrimethylene) bis-isomaleimide, N,N'-(2-bromotrimethylene) bis-isomaleimide, N,N'-(2-chlorotetramethylene) bis-isomaleimide, N,N'-(3-chlorohexamethylene) bis-isomaleimide, N,N'-(2-ethoxytetramethylene) bis-isomaleimide, N,N'-(1-ethoxytetramethylene) bis-isomaleimide, N,N'-[1,4-(2-methoxycyclohexane)] bis-isomaleimide, N,N'-(2-phenoxyethylene) bis-isomaleimide, N,N'-(2-phenoxytrimethylene) bis-isomaleimide, N,N'-[1,4-(2-phenoxycyclohexane)] bis-isomaleimide, N,N'-[1,4-(2-nitrocyclohexane)] bis-isomaleimide, N,N'-phenyl ethylene bis-isomaleimide, N,N'-(2-phenylethylene) bis-isomaleimide, N,N'-(2-phenyltrimethylene) bis-isomaleimide, N,N'-(2-phenyltetramethylene) bis-isomaleimide, N,N'-(1-phenyldodecamethylene) bis-isomaleimide, N,N'-(1,4-phenylene) bis-isomaleimide, N,N'-(1,5-naphthalene) bis-isomaleimide, N,N'-[1,4-(2-chlorophenylene)] bis-isomaleimide, N,N'-[1,4-(2-bromophenylene)] bis-isomaleimide, N,N'-[1,4-(2-methoxyphenylene)] bis-isomaleimide, N,N'-[1,4-(2-ethoxyphenylene)] bis-isomaleimide, N,N'-[1,4-(2-phenoxyphenylene)] bis-isomaleimide, N,N'-[1,4-(2-methylphenylene)] bis-isomaleimide, N,N'-[1,4-(2-ethylphenylene)] bis-isomaleimide, N,N'-(4,4'-diphenyl methane) bis-isomaleimide, N,N'-(4,4'-diphenylether) bis-isomaleimide, N,N'-[1,4-(2-n-dodecylphenylene)] bis-isomaleimide, N,N'-(4,4'-benzophenone) bis-isomaleimide, and the like.

Particularly desirable compounds for purposes of this invention are those wherein R is either a monovalent or divalent radical as previously described having a maximum of 20 carbon atoms and being free of interfering groups such as —COOH and NH₂.

In its broadest aspect, the process by which the N-substituted isomaleimides of the present invention are prepared is conducted by admixing an N-substituted maleamic acid having the general formula:

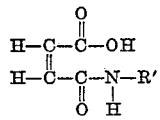

in which R' is a monovalent hydrocarbon radical as previously defined for R or a divalent hydrocarbon radical, also as previously defined for R, having as a substituent on its terminal carbon atom a radical having the formula:

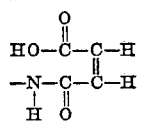

with a halogenated acyl halide and an organic tertiary amine.

The term "halogenated acyl halide" as used herein is intended to encompass those compounds having the formula:

wherein $R^2$ is a halogenated alkyl radical having at least one halogen atom, i.e., chlorine, bromine, fluorine, or iodine, attached to its α-carbon atom, that is, the carbon attached to

and X is either chlorine, bromine, fluorine or iodine.

Particularly desirable halogenated acyl halides for purposes of the present invention are those wherein $R^2$ has a maximum of 12 carbon atoms. Representative radicals for $R^2$ include chloromethyl, bromomethyl, fluoromethyl, iodomethyl, α-chloroethyl, α-bromoethyl, α-fluoroethyl, α-iodoethyl, α-iodo-n-propyl, α-chloro-n-amyl, α-bromo-n-amyl, α-fluoro-n-amyl, α-iodo-n-amyl, α-chloro-n-hexyl, α-bromo-n-hexyl, α-fluoro-n-hexyl, α-iodo-n-hexyl, α-chloro-β-ethyl-n-propyl, α-bromo-β-ethyl-n-hexyl, α-chlorododecyl, α-bromododecyl, dichloromethyl, α,α-dichloroethyl, α,β-dichloro-n-propyl, trifluoromethyl, trichloromethyl, α,α-difluoromethyl, and the like. Specific compounds include, among others, chloroacetyl chloride, bromoacetyl chloride, iodoacetyl chloride, chloroacetyl iodide, α-chloropropionyl chloride, dibromoacetyl bromide, dichloroacetyl chloride, trifluoroacetyl chloride, trifluoroacetyl bromide, and the like.

Any of the organic tertiary amines can be used for purposes of the present invention. Particularly preferred are the organic tertiary amines which are free of interfering groups such as —COOH and —NH₂, having a maximum of 20 carbon atoms and also being free of olefinic and acetylenic unsaturation. Among suitable organic tertiary amines can be noted trimethylamine, triethylamine, tri-n-propylamine, tri-n-butylamine, tri-n-amylamine, tri-n-hexylamine, tri-(2-ethyl-n-hexyl)amine, tri-n-heptylamine, dimethylbutylamine, methylhexylpropylamine, N-methyl-N-hexyl aniline, N,N'-dimethyl-p-ethoxy aniline, N-methyl morpholine, N-ethyl morpholine, N,N'-dimethyl anisidine, 2-chloropyridine, 4-chloropyridine, quinuclidine, quinoline, N,N'-dimethyl piperazine, and the like.

The preparation of an N-substituted isomaleimide wherein R is a monovalent hydrocarbon radical as previously described can be illustrated by the reaction of a mixture containing N-n-butyl maleamic acid, dichloroacetyl chloride, and triethylamine. This reaction can be represented by the following equations:

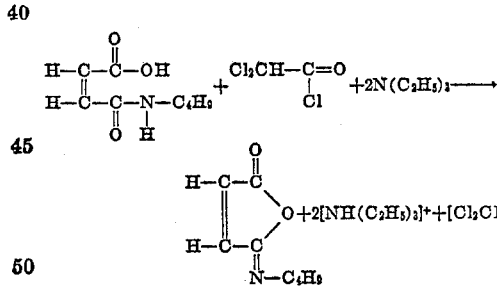

The preparation of an N-substituted isomaleimide wherein R is a divalent hydrocarbon radical having as a substituent on its terminal carbon atom the radical previously noted can be illustrated by the reaction of a mixture containing N,N'-(4,4'-diphenylmethane)-bis-maleamic acid, dichloroacetyl chloride, and triethylamine. This reaction can be represented by the following equations:

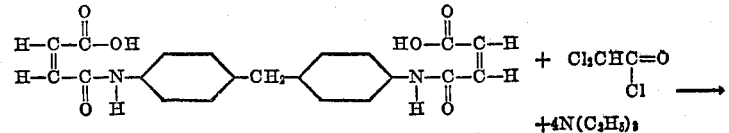

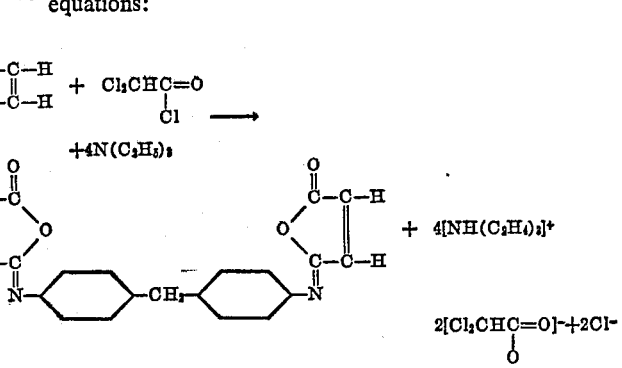

Various amounts of the different starting materials can be used. Generally, it is preferred to use at least about a stoichiometric amount of the halogenated acyl halide. Using more than a stoichiometric amount can be used if so desired, but it is economically undesirable. For purposes of stoichiometric calculations, one acyl halide group:

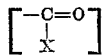

is deemed to react with one carboxylic acid group —COOH. The organic tertiary amine is also used in at least stoichiometric amounts. If desired, however, more than a stoichiometric amount can be used, but again this is economically unattractive. For purposes of stoichiometric calculations, two amine groups

are considered to react with one acyl halide group:

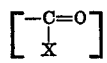

The temperature at which the process of the present invention is conducted can be varied over a wide range, from as low as —70° C. to a temperature just below the decomposition temperature of the reactants and of the isomaleimide product formed. At temperatures lower than about —70° C., the reaction proceeds sluggishly. A temperature in the range of about —5° C. to about 85° C. is most preferred.

It is also preferred to conduct the present process in the presence of an organic diluent which is a solvent for the starting materials and is non-reactive with respect to the starting materials and the final product.

The reaction involved in the instant process is exothermic. If an organic diluent is not present, it may be difficult to remove the heat of reaction, which, if not removed, might cause undesirable side reactions to occur. In addition, the use of an organic diluent facilitates removal of the N-substituted isomaleimide from the starting materials.

The actual organic diluent used will depend upon the starting materials and the temperature at which the reaction is to be conducted. The organic diluent should have a boiling point at or above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxy benzene and the like; aliphatic hydrocarbons, such as n-hexane, n-heptane, and the like; halogenated aliphatic hydrocarbons, such as dichloromethane, 1,2-dichloroethane, and the like; ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide and the like.

The process of this invention is conducted, generally, under atmospheric pressures, although, if desired, the reaction can be conducted under subatmospheric or superatmospheric pressure.

The process of the present invention is conducted by simply admixing the reactants, in any order, at the desired temperature. The reaction involved is practically instantaneous in that some isomaleimide is formed immediately upon admixing of the reactants. Usually, however, the reaction mixture is allowed to stand for at least about one hour in order to insure that the reaction has proceeded to completion.

Recovery of the N-substituted isomaleimide from the reaction mixture can be accomplished by any one of a number of convenient methods, for example, by subjecting the reaction mixture to filtration, distillation, evaporation, or any combination of the three, depending upon the nature of the N-substituted isomaleimide produced. If desired, the N-substituted isomaleimide, after removal from the reaction mixture, can be washed with water or with an aqueous solution of sodium bicarbonate, can be taken up by an organic diluent and passed through a Florisil column, or if a solid, it can be recrystallized from suitable solvents, such as the organic liquids previously noted in this specification as organic diluents.

The N-substituted maleamic acid intermediates which can be used in the preparation of the corresponding isomaleimides of the present invention can be obtained by reacting, in suitable solvents, approximately equimolar quantities of a primary mono- or primary diamine with maleic anhydride. In producing an N-substituted maleamic acid having the formula previously given wherein R' is a monovalent hydrocarbon radical, the following primary mono-amines can be used: methylamine, ethylamine, isopropylamine, n-butylamine, isobutylamine, isoamylamine, n-hexylamine, n-heptylamine, n-octylamine, n-dodecylamine, cyclohexylamine, 2-chloroethylamine, 2-bromoethylamine, 2-fluoroethylamine, 2-iodopropylamine, chlorocyclohexylamine, methoxymethylamine, 2 - phenoxy-n-propylamine, benzylamine, 2-phenethylamine, 3-phenyl-n-propylamine, 4 - phenyl-n-butylamine, naphthylamine, p-toluidine, o-p-xylylidine, o-ethylaniline, m-ethylaniline, p-ethylaniline, o-isopropylaniline, m-isopropylaniline, p-isopropylaniline, o-n-butylaniline, m-n-butylaniline, p-n-butylaniline, p-n-octylaniline, o-chloroaniline, m-bromoaniline, p-fluoroaniline, o-iodoaniline, o-methoxyaniline, m-methoxyaniline, p-ethoxyaniline, p-n-butoxyaniline, o-nitroaniline, p-nitroaniline, 4-chloro-3-methylaniline, o-toluidine, m-toluidine, 4-sulfamylaniline, and the like.

In producing an N-substituted maleamic acid having the formula previously given wherein R' is a divalent hydrocarbon radical, the following primary diamines can be used: 1,2-diaminoethane, 1,3-diamino-n-propane, 1,4-diamino-n-butane, 1,5-diamino - n - pentane, 1,6-diamino-n-hexane, 1,10-diamino-n-decane, 1,4-phenylene diamine, 4,4'-diamino-diphenylmethane, and the like. Process for producing maleamic acids is further described in the book "Maleic Anhydride Derivatives" by L. A. Flett and W. H. Gardner, which is incorporated herein by reference.

The N-substituted isomaleimides of the present invention can be used as fungicides and defoliants. These compounds can also be isomerized to the corresponding maleimides which are known compounds having utility as insecticides. The so-called bis-isomaleimides of the present invention have particular utility in that they can be polymerized with primary diamines to produce polymers which can be molded into various articles, such as lamp bases, television cabinets, and the like, as well as extruded into film material which can be used as wrapping material for food articles, such as bread, meat, and the like. Moreover, these polymers can be cross-linked with sulfur to form infusible, insoluble products.

The following example further illustrates the present invention and is not intended to limit the scope thereof in any manner.

EXAMPLE 1

*Preparation of N-phenyl isomaleimide*

Into a dry, round bottom Pyrex glass flask equipped with a stirrer, thermometer, dropping funnel, and reflux condenser and containing 133 ml. of dichloromethane there was charged 6.4 grams of N-phenyl maleamic acid and 7.3 grams of triethylamine. The resultant solution was cooled to between 0° C.–5° C. and 5 grams of dichloroacetyl chloride added dropwise thereto over a period of 10 minutes. The mixture was stirred for one hour at room temperature (about 25° C.) and washed with successive 100 ml. portions of water and a 10 percent by weight aqueous sodium bicarbonate solution.

The organic layer was separated from the water layers, dried over magnesium sulfate, and filtered. The filtrate was concentrated to a brownish-yellow colored solid residue. The solid product was then recrystallized from a 1:2 by volume mixture of carbon tetrachloride and hexane. The solid product was identified as N-phenyl isomaleimide by infra-red analysis which showed a strong band at 5.6μ. This band is consistent with the isomaleimide structure. The melting point of N-phenyl isomaleimide was determined as 60° C.–62° C.

What is claimed is:

1. Process for the preparation of an N-substituted isomaleimide which comprises admixing an N-substituted maleamic acid having the formula:

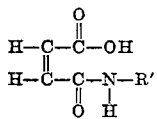

wherein R' is a member selected from the group consisting of a monovalent hydrocarbon radical, and a divalent hydrocarbon radical having as a substituent on its terminal carbon atom a radical having the formula:

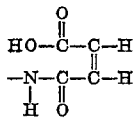

with at least about a stoichiometric amount of a halogenated acyl halide having the formula:

wherein R² is a halogenated alkyl radical having at least one halogen atom attached to its α carbon atom and X is a halogen atom, and with at least about a stoichiometric amount of an organic tertiary amine, for a period of time sufficient to produce the corresponding N-substituted isomaleimide.

2. Process as defined in claim 1 wherein the N-substituted maleamic acid is N-phenyl maleamic acid.

3. Process as defined in claim 1 wherein the halogenated acyl halide is dichloroacetyl chloride.

4. Process as defined in claim 1 wherein the organic tertiary amine is triethylamine.

5. Process as defined in claim 1 wherein the reacting materials are admixed at a temperature from about —70° C. to below the decomposition temperature of the reactants and of the N-substituted isomaleimide formed.

6. Process as defined in claim 1 wherein the reacting materials are admixed at a temperature of from about —5° C. to about 85° C.

7. Process for the preparation of an N-substituted isomaleimide which comprises admixing in an organic diluent and at a temperature of from about —5° C. to about 85° C. an N-substituted maleamic acid having the formula:

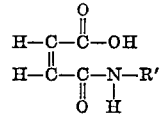

wherein $R_2$ is a member selected from the group consisting of a monovalent hydrocarbon radical and a divalent hydrocarbon radical having as a substituent on its terminal carbon atom a radical having the formula:

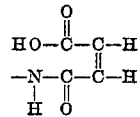

with a stoichiometric amount of a halogenated acyl halide having the formula:

wherein R² is a halogenated alkyl radical having at least one halogen atom attached to its α carbon atom and X is a halogen atom and with a stoichiometric amount of an organic tertiary amine, for a period of time sufficient to produce the corresponding N-substituted isomaleimide.

References Cited in the file of this patent

Piutti: "Gazz. Chim. Ital.," vol. 40, pp. 488; 508 to 515 (1910).

Tsou et al.: "J. Am. Chem. Society," vol. 77, pp. 4613–4615 (1955).

Roderick: J. Am. Chem. Soc., vol. 79, pp. 1710–12, (1957).